(12) United States Patent
Kim et al.

(10) Patent No.: US 12,433,328 B2
(45) Date of Patent: Oct. 7, 2025

(54) SMOKING ARTICLE FILTER INCLUDING SOLID FLAVORING AGENT AND METHOD OF MANUFACTURING THE SAME

(71) Applicant: KT&G CORPORATION, Daejeon (KR)

(72) Inventors: Ick Joong Kim, Daejeon (KR); Kyung Bin Jung, Daejeon (KR)

(73) Assignee: KT&G CORPORATION, Daejeon (KR)

( * ) Notice: Subject to any disclaimer, the term of this patent is extended or adjusted under 35 U.S.C. 154(b) by 520 days.

(21) Appl. No.: 17/782,833

(22) PCT Filed: Jul. 2, 2021

(86) PCT No.: PCT/KR2021/008432
§ 371 (c)(1),
(2) Date: Jun. 6, 2022

(87) PCT Pub. No.: WO2022/010191
PCT Pub. Date: Jan. 13, 2022

(65) Prior Publication Data
US 2023/0016146 A1    Jan. 19, 2023

(30) Foreign Application Priority Data

Jul. 6, 2020 (KR) .......................... 10-2020-0082717

(51) Int. Cl.
*A24D 3/14* (2006.01)
*A24D 1/00* (2020.01)
(Continued)

(52) U.S. Cl.
CPC .............. *A24D 3/14* (2013.01); *A24D 1/002* (2013.01); *A24D 1/045* (2013.01); *A24D 3/0225* (2013.01); *A24D 3/0254* (2013.01); *A24D 3/0287* (2013.01); *A24D 3/048* (2013.01); *A24D 3/17* (2020.01)

(58) Field of Classification Search
CPC ..................................... A24D 3/14; A24D 3/17
See application file for complete search history.

(56) References Cited

U.S. PATENT DOCUMENTS 4,963,369 A * 10/1990 Song ................. A23G 4/02
426/651
5,064,669 A   11/1991 Tan et al.
(Continued)

FOREIGN PATENT DOCUMENTS

CN   111528323 A * 8/2020
IE        904504 A1 * 6/1991 ............... A23G 3/36
(Continued)

OTHER PUBLICATIONS

Machine Translation of CN 111528323 (Year: 2025).*
Office Action dated Oct. 25, 2022 from the Japanese Patent Office in Application No. 2021-553035.
(Continued)

*Primary Examiner* — Russell E Sparks
(74) *Attorney, Agent, or Firm* — Sughrue Mion, PLLC (57) ABSTRACT

A smoking article filter has a flavoring agent uniformly distributed in the smoking article filter, wherein the flavoring agent is in a solid state at room temperature and includes at least one natural wax and a flavoring component soaked into the at least one natural wax. Also provided are a smoking article including the smoking article filter and a method of manufacturing a smoking article.

9 Claims, 3 Drawing Sheets

(51) Int. Cl.
 *A24D 1/04* (2006.01)
 *A24D 3/02* (2006.01)
 *A24D 3/04* (2006.01)
 *A24D 3/17* (2020.01)

(56) References Cited

U.S. PATENT DOCUMENTS

2006/0174901 A1 8/2006 Karles et al.
2011/0271968 A1* 11/2011 Carpenter ............... A24D 3/048
 131/342
2013/0137561 A1 5/2013 Sampson et al.
2015/0034099 A1* 2/2015 Besso .................... A24B 15/32
 131/328
2017/0295842 A1* 10/2017 Mishra .................... A23L 27/72

FOREIGN PATENT DOCUMENTS

| JP | 2013-523113 A | 6/2013 |
| JP | 2014-526240 A | 10/2014 |
| JP | 2015-142576 A | 8/2015 |
| JP | 2019-515673 A | 6/2019 |
| KR | 10-2013-0009823 A | 1/2013 |
| KR | 10-2020-0018136 A | 2/2020 |
| RU | 1836038 A3 | 8/1993 |

OTHER PUBLICATIONS

Office Action dated Dec. 29, 2022 from the Russian Patent Office in Application No. 2022117910/03.
International Search Report for PCT/KR2021/008432, dated Oct. 26, 2021.
Extended European Search Report dated Jul. 20, 2022 in European Application No. 21769619.4.

* cited by examiner

SMOKING ARTICLE FILTER INCLUDING SOLID FLAVORING AGENT AND METHOD OF MANUFACTURING THE SAME

CROSS REFERENCE TO RELATED APPLICATIONS

This application is a National Stage of International Application No. PCT/KR2021/008432 filed Jul. 2, 2021, claiming priority based on Korean Patent Application No. 10-2020-0082717 filed Jul. 6, 2020.

TECHNICAL FIELD

The present disclosure relates to a smoking article filter including a solid flavoring agent and a method of manufacturing the same, and more particularly, to a smoking article filter including a solid flavoring agent using natural wax and a method of manufacturing the same.

BACKGROUND ART

Research has been carried out on technologies for adding a flavor to an aerosol provided from cigarettes. For example, in order to add a flavor to an aerosol, a method of spraying a flavoring onto a medium portion or filter portion constituting a cigarette has been utilized in manufacturing cigarettes.

Meanwhile, in the related art where a flavor is dissolved into a solvent, such as water, ethanol, propylene glycol and a medium chain fatty acid triglyceride, and added to a cigarette composition, there are disadvantages in that the retention and persistence of a flavoring component in the cigarette are poor, a flavor is not expressed well when a user smokes the cigarette, and a tobacco taste and flavor expression are not consistent.

In order to overcome such disadvantages, in recent years, technologies for applying solid flavoring agents such as granules, sheets, and capsules to cigarettes have been introduced. However, there is a disadvantage in that applying solid flavoring agents are more complicated than applying liquid flavoring agents. For example, a separate adding device is required to apply solid flavoring agents to cigarettes, and it is difficult to evenly add the solid flavoring agents.

DISCLOSURE

Technical Problem

The present disclosure is directed to providing a smoking article filter including a solid flavoring agent and a method of manufacturing the same capable of simultaneously facilitating the application of a flavoring agent to a cigarette and securing the retention and uniformity of the flavoring agent and persistence of flavor expression.

Objectives of the present disclosure are not limited to the above-mentioned objectives, and other unmentioned objectives should be clearly understood by those of ordinary skill in the art to which the present disclosure pertains from the description below.

Technical Solution

Some embodiments of the present disclosure provide a smoking article filter including a flavoring agent uniformly distributed in the smoking article filter, wherein the flavoring agent is in a solid state at room temperature and includes at least one natural wax and a flavoring component soaked into the at least one natural wax.

In some embodiments, a melting point of the flavoring agent may be in a range of 30° C. to 80° C., preferably, in a range of 20° C. to 50° C. More preferably, a melting point of the at least one natural wax may be in a range of 30° C. to 50° C., and the melting point of the flavoring agent may be in a range of 25° C. to 45° C.

A total weight of the flavoring agent contained in the smoking article filter may be in a range of 1 mg to 25 mg, preferably, in a range of 1 mg to 15 mg, but the total weight of the flavoring agent contained in the filter may, of course, vary according to the physical dimensions of the smoking article filter.

In some embodiments, a weight of the flavoring agent contained in unit volume ($mm^3$) of the smoking article filter may be in a range of 1 μg to 30 μg.

Meanwhile, a weight of the at least one natural wax included in the flavoring agent may be in a range of 20% to 98%, preferably, in a range of 40% to 60%, of the total weight of the flavoring agent.

Some embodiments of the present disclosure provide a smoking article including the smoking article filter and a smoking material portion disposed upstream of the smoking article filter.

In some embodiments, the smoking article may further include a tube filter which is disposed between the smoking article filter and the smoking material portion, has a hollow formed inside, and has the flavoring agent uniformly distributed in the tube filter.

Some embodiments of the present disclosure provide a method of manufacturing a smoking article, the method including preparing a flavoring agent in which at least one natural wax and a flavoring component are mixed and melted, adding the melted flavoring agent into a smoking article filter rod, and cutting the smoking article filter rod to manufacture smoking article filters.

In some embodiments, the adding of the melted flavoring agent into the smoking article filter rod may include spraying the melted flavoring agent into the smoking article filter rod using a jet nozzle.

Meanwhile, in the preparing of the flavoring agent and the spraying of the flavoring agent, a temperature of the melted flavoring agent may be in a range of 30° C. to 80° C. Preferably, the temperature of the melted flavoring agent may be in a range of 60° C. to 80° C. in the preparing of the flavoring agent, and the temperature of the melted flavoring agent may be in a range of 50° C. to 70° C. and a viscosity of the melted flavoring agent may be in a range of 10 cP to 35 cP in the spraying of the flavoring agent.

For example, the at least one natural wax may include at least one of cocoa butter and shea butter, and the flavoring component may include L-menthol.

A weight of the at least one natural wax included in the flavoring agent may be in a range of 20% to 98%, preferably, in a range of 40% to 60%, of the total weight of the flavoring agent, and here, a melting point of the at least one natural wax may be in a range of 30° C. to 50° C., and the melting point of the flavoring agent may be in a range of 25° C. to 45° C.

In some embodiments, the at least one natural wax may include 30 wt % to 70 wt % of the cocoa butter and 30 wt % to 70 wt % of the shea butter.

Meanwhile, the method of manufacturing a smoking article may further include combining a smoking material portion with an upstream end of the smoking article filter by wrapping. Here, in the preparing of the flavoring agent and the adding of the flavoring agent, a temperature of the melted flavoring agent may be in a range of 30° C. to 80° C. Preferably, the temperature of the melted flavoring agent may be in a range of 60° C. to 80° C. in the preparing of the flavoring agent, the temperature of the melted flavoring agent may be in a range of 50° C. to 70° C. in the adding of the flavoring agent, and a temperature of the flavoring agent in a solid state may be in a range of 15° C. to 30° C. in the combining of the smoking article filter and the smoking material portion by wrapping.

Advantageous Effects

When a filter including a solid flavoring agent according to embodiments of the present disclosure is applied to a smoking article, retention of a flavoring component in the filter can be improved, and an amount of expressed flavor can also be increased during smoking.

Further, the smoking article including the solid flavoring agent prepared according to embodiments of the present disclosure can minimize the spread of components between different segments during a storage period. In this way, it is possible to reduce an off-flavor, which may occur due to a moisturizer contained in a smoking material portion, a plasticizer contained in the filter, and the like spreading to and reacting with another segment, or to mask the off-flavor with a flavoring component.

Also, the solid flavoring agent according to embodiments of the present disclosure is sprayed into a filter using a nozzle in a liquid state. In this way, it is possible to uniformly distribute the solid flavoring agent into the filter without a separate device for adding the solid flavoring agent, and accordingly, it is also possible to simplify a process of adding the solid flavoring agent and to secure economic feasibility of the process.

MODES OF THE INVENTION

Hereinafter, exemplary embodiments of the present disclosure will be described in detail with reference to the accompanying drawings. Advantages and features of the present disclosure and methods of achieving the same should become clear with embodiments described in detail below with reference to the accompanying drawings. However, the present disclosure is not limited to the embodiments disclosed below and may be implemented in various other forms. The embodiments make the disclosure of the present disclosure complete and are provided to completely inform those of ordinary skill in the art to which the present disclosure pertains of the scope of the disclosure. The scope of the present disclosure is defined only by the scope of the claims. Like reference numerals refer to like elements throughout.

Unless otherwise defined, all terms including technical or scientific terms used herein have the same meaning as commonly understood by those of ordinary skill in the art to which the present disclosure pertains. Terms defined in commonly used dictionaries should not be construed in an idealized or overly formal sense unless expressly so defined herein.

Also, in the specification, a singular expression includes a plural expression unless the context clearly indicates otherwise. The terms "comprises" and/or "comprising" used herein do not preclude the possibility of the presence or addition of one or more elements, steps, operations, and/or devices other than those mentioned.

Terms including ordinals such as "first" or "second" used herein may be used to describe various elements, but the elements are not limited by the terms. The terms are only used for the purpose of distinguishing one element from another element.

Throughout the specification, "smoking article" may refer to anything capable of generating an aerosol, such as tobacco (cigarette) and cigars. The smoking article may include an aerosol-generating material or an aerosol-forming substrate. Also, the smoking article may include a solid material based on tobacco raw materials, such as reconstituted tobacco leaves, shredded tobacco, and reconstituted tobacco. A smoking material may include a volatile compound.

Also, in description of a smoking article, "upstream" or "upstream direction" refers to a direction moving away from an oral region of a user smoking the smoking article, and "downstream" or "downstream direction" refers to a direction approaching the oral region of the user smoking the smoking article. For example, in a smoking article 100 illustrated in FIG. 2, a smoking material portion 120 is disposed upstream of or in an upstream direction from a filter portion 110.

Figure 1:
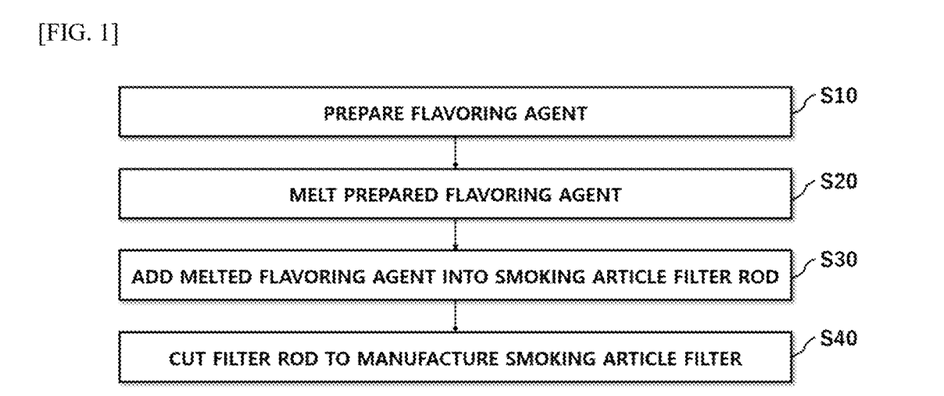
FIG. 1 is a flowchart illustrating a method of manufacturing a smoking article filter according to some embodiments of the present disclosure.

FIG. 1 is a flowchart illustrating a method of manufacturing a smoking article filter according to some embodiments of the present disclosure.

Referring to FIG. 1, the method of manufacturing a smoking article filter may include preparing a flavoring agent (S10), melting the prepared flavoring agent (S20), adding the melted flavoring agent into a smoking article filter rod (S30), and cutting the smoking article filter rod to manufacture smoking article filters (S40).

In the preparing of the flavoring agent (S10), at least one natural wax and a flavoring component may be mixed and melted to prepare the flavoring agent.

The flavoring agent may be prepared under temperature conditions in a range of about 30° C. to 90° C., preferably, in a range of about 60° C. to 80° C. In the preparing of the flavoring agent, both the at least one natural wax and the flavoring component may be in a liquid state. That is, the at least one natural wax may be in a liquid state instead of a solid state, and the flavoring component may be in a liquid state instead of a gaseous state.

In some embodiments, the flavoring agent may be a mixture of natural wax and a flavoring component, which is in a solid state at a temperature lower than or equal to about 30° C. and is in a liquid state having a viscosity of 50 cP or lower at a temperature higher than or equal to 50° C.

Preferably, the flavoring agent may be a mixture of natural wax and a flavoring component, which is in a solid state at a temperature lower than or equal to about 45° C., is in a liquid state having a viscosity in a range of 10 cP to 35 cP at a temperature in a range of 50° C. to 70° C. (for example, the temperature of the flavoring agent when being added into the filter rod), and is in a liquid state having a viscosity in a range of 1 cP to 15 cP at a temperature in a range of 60° C. to 80° C. (for example, the temperature of the flavoring agent in the preparing step).

In a case in which the flavoring agent has the above state conditions, the natural wax and the flavoring component may be more uniformly mixed in the preparing step (S10), the flavoring agent may be uniformly absorbed into the filter while being sprayed without causing an issue of blockage of a jet nozzle in the adding step (S30), and the flavoring component may be effectively held in cigarettes in subsequent processes of manufacturing cigarettes using the filter and during a storage period of cigarettes after the cigarettes are manufactured.

Meanwhile, in order to secure a good flavor retention characteristic of cigarettes during storage thereof and a good flavor expression characteristic of the cigarettes during smoking thereof as will be described below, the above state conditions of the flavoring agent should be satisfied in a state in which the flavoring agent contains the at least one natural wax in the amount of at least 20 wt % or more (preferably, about 40 wt % to 60 wt %). Here, a melting point of the at least one natural wax may be in a range of about 30° C. to 80° C. (preferably, in a range of 35° C. to 45° C.), and a melting point of the flavoring agent may be in a range of about 20° C. to 80° C. (preferably, in a range of 25° C. to 40° C.).

Meanwhile, types of the natural wax and flavoring component included in the flavoring agent are not limited as long as the natural wax and flavoring component are able to satisfy the above state conditions of the flavoring agent.

In some embodiments, the at least one natural wax may include at least one of a long chain fatty acid, a fatty acid ester, a fatty acid diester, and a fatty acid triester.

For example, the at least one natural wax may include cocoa butter, shea butter, beeswax, white wax, lanolin, shellac, spermaceti, palm oil, palm kernel oil, mango oil, soybean oil, cottonseed oil, coconut oil, carnauba wax, candelilla wax, bayberry wax, sugar cane wax, castor wax, esparto wax, Japan wax, jojoba wax, ouricury wax, rice bran wax, soy wax, ceresin wax, montan wax, ozokerite wax, peat wax, or a combination thereof.

For example, the flavoring component may include menthol, licorice, saccharose, fructose syrup, isosweet, cocoa, lavender, cinnamon, cardamom, celery, fenugreek, cascarilla, white sandalwood, bergamot, geranium, honey essence, rose oil, vanilla, lemon oil, orange oil, mint oil, cinnamon, caraway, cognac, jasmine, chamomile, cinnamon, ylang-ylang, sage, spearmint, ginger, cilantro, coffee, or a combination thereof.

Preferably, the at least one natural wax may include at least one of cocoa butter and shea butter, and the flavoring component may include L-menthol. As a more specific example, the at least one natural wax may be configured to include 30 wt % to 70 wt % of the cocoa butter and 30 wt % to 70 wt % of the shea butter, and the flavoring agent may include 20 wt % to 98 wt % (preferably, 40 wt % to 60 wt %) of the at least one natural wax and 40 wt % to 60 wt % of the flavoring component.

In the melting of the prepared flavoring agent (S20), in order to add the flavoring agent into a filter which will be described below, the flavoring agent, which is stored at room temperature and present in a solid state, may be melted to a liquid state.

Meanwhile, although the preparing of the flavoring agent (S10) and the melting of the prepared flavoring agent (S20) are described as separate processes in the present specification, alternatively, the preparing of the flavoring agent (S10) and the melting of the prepared flavoring agent (S20) may be substantially performed in a single process. That is, the liquid-state flavoring agent in the preparing of the flavoring agent (S10) may be added to the filter rod (S30) without an intermediate process in which the liquid-state flavoring agent is solidified after being prepared.

In the adding of the flavoring agent into the smoking article filter rod (S30), the flavoring agent may be uniformly distributed into the smoking article filter rod.

The adding of the flavoring agent (S30) may be performed in various ways such as causing the flavoring agent to freely fall onto the filter rod and then permeate thereinto or spraying the flavoring agent into the filter rod using a jet nozzle.

Preferably, the flavoring agent may be sprayed into the filter rod using a jet nozzle. In order to spray the flavoring agent, which is in a solid state at room temperature, using the jet nozzle, the flavoring agent in the adding of the flavoring agent (S30) may be heated to a temperature higher than or equal to the melting point thereof so that the flavoring agent reaches a liquid state.

In some embodiments, a temperature of the flavoring agent in the preparing of the flavoring agent (S10) and the adding of the flavoring agent (S30) may be in a range of about 30° C. to 80° C. Alternatively, a temperature of the flavoring agent in the adding of the flavoring agent (S30) may be higher than the melting point of the flavoring agent but lower than a temperature of the flavoring agent in the preparing of the flavoring agent (S10). For example, the temperature of the flavoring agent in the preparing step (S10) may be in a range of about 60° C. to 80° C., and the temperature of the flavoring agent in the adding step (S30) may be in a range of about 50° C. to 70° C.

In the adding of the flavoring agent (S30), the amount of added flavoring agent may be in a range of about 50 µg to 1,000 µg per unit length (mm) of the filter rod in a direction in which the filter rod extends. For example, in a case in which a length of a single filter rod is 80 mm, the amount of flavoring agent added into the single filter rod may be in a range of about 4 mg to 135 mg. For example, in a case in which a length of a single filter is 15 mm, the amount of flavoring agent added into the single filter may be in a range of about 0.75 mg to 25 mg.

In some embodiments, the amount of added flavoring agent per unit volume ($mm^3$) of the filter rod may be in a range of about 1 µg to 30 µg.

The filter rod into which the flavoring agent is added may be manufactured into smoking article filters through a cutting process (S40).

In some embodiments, wrapping the filter rod with a wrapper may be additionally performed between the adding of the flavoring agent (S30) and the cutting of the filter rod (S40). In this case, loss of the flavoring agent absorbed into the filter rod, which may occur in subsequent processes of manufacturing cigarettes, may be further prevented.

After the manufacturing of the smoking article filters (S40), combining a smoking material portion, which is filled with an aerosol-generating material such as shredded tobacco and reconstituted tobacco leaves, with the manufactured filters may be additionally performed to manufacture a smoking article including the smoking article filter of the present disclosure. The combining of the filter and the smoking material portion may be performed by wrapping at least some areas of the filter and the smoking material portion with a tipping wrapper or the like.

In some embodiments, the temperature of the flavoring agent in the preparing of the flavoring agent (S10) may be in a range of about 60° C. to 80° C., the temperature of the flavoring agent in the adding of the flavoring agent (S20) may be in a range of about 50° C. to 70° C., and the temperature of the flavoring agent in the combining of the filter and the smoking material portion may be in a range of about 15° C. to 30° C. In this way, the natural wax and flavoring component may be more uniformly mixed, the flavoring agent may be uniformly absorbed into the filter while being sprayed without causing an issue of blockage of a jet nozzle, and retention of the flavoring component may be efficiently improved in subsequent processes of manufacturing cigarettes or during a storage period of the cigarettes.

Figure 2:
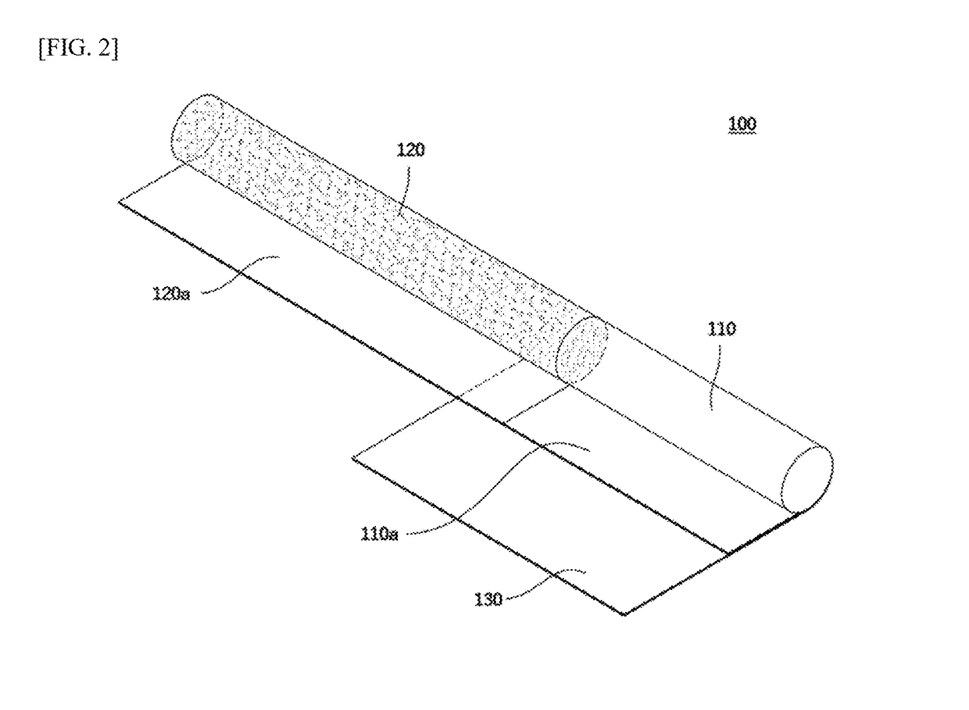
FIG. 2 is a view illustrating a configuration of a combustion-type smoking article in which the smoking article filter according to some embodiments of the present disclosure is adopted.

FIG. 2 is a view illustrating a configuration of a combustion-type smoking article in which the smoking article filter according to some embodiments of the present disclosure is adopted.

Referring to FIG. 2, the smoking article 100 may include the filter portion 110 wrapped with a filter wrapper 110a, the smoking material portion 120 wrapped with a smoking material wrapper 120a, and a tipping paper 130 configured to combine the filter portion 110 and the smoking material portion 120.

The filter portion 110 may be disposed downstream of the smoking material portion 120 and may be a region through which an aerosol material generated in the smoking material portion 120 passes right before being inhaled by the user.

The filter portion 110 may be made of various materials. For example, the filter portion 110 may be a cellulose acetate filter.

In some embodiments, the filter portion 110 may be a tubular structure including a hollow formed therein. The filter portion 110 may also be manufactured by inserting structures such as films or tubes made of the same or different materials thereinto (for example, into the hollow).

The filter portion 110 of the present embodiment is illustrated as a mono filter formed of a single filter, but the present disclosure is not limited thereto. For example, the filter portion 110 may, of course, be provided as a dual filter which includes two acetate filters, a triple filter, or the like in order to increase filter efficiency.

Further, although not illustrated, a crushable capsule (not illustrated), which has a structure in which a liquid filled therein including a flavoring is wrapped by a film, may be included inside the filter portion 110.

The filter portion 110 is disposed downstream of the smoking material portion 120 to serve as a filter through which an aerosol material generated in the smoking material portion 120 passes right before being inhaled by the user.

Meanwhile, the filter portion 110 may be a filter that is flavored using the method described above with reference to FIG. 1. That is, the flavoring agent, which is in a solid state at room temperature and includes at least one natural wax and a flavoring component soaked into the at least one natural wax, is uniformly distributed into the filter portion 110. A total weight of the flavoring agent contained in the filter portion 110 may be in a range of about 1 mg to 25 mg, preferably, in a range of about 1 mg to 15 mg, and more preferably, in a range of about 2 mg to 3 mg. Also, a weight of the flavoring agent per unit volume ($mm^3$) of the filter portion 110 may be in a range of about 1 μg to 30 μg, preferably, in a range of 2 μg to 10 μg.

The filter portion 110 may be wrapped with the filter wrapper 110a. The filter wrapper 110a may be made of grease-resistant wrapping paper and may further include an aluminum foil disposed on an inner surface thereof.

The smoking material portion 120 may be filled with raw tobacco leaves, reconstituted tobacco leaves, or a mixture of the tobacco leaves and reconstituted tobacco leaves. The mixture may be filled in the form of a sheet or shredded tobacco in the smoking material portion 120. The smoking material portion 120 may have the form of a longitudinally extending rod which may have various lengths, circumferences, and diameters.

The smoking material portion 120 may include at least one aerosol-generating material among glycerin, propylene glycol, ethylene glycol, dipropylene glycol, diethylene glycol, triethylene glycol, tetraethylene glycol, and oleyl alcohol. Also, the smoking material portion 120 may contain other additives such as a flavoring agent, a wetting agent, and/or an acetate compound.

The smoking material portion 120 may be wrapped with the smoking material wrapper 120a. Although not illustrated, the smoking material wrapper 120a may have a double wrapping paper structure. Further, the smoking material wrapper 120a may be low ignition propensity (LIP) cigarette paper having one or more LIP bands (not illustrated) formed therein.

The filter portion 110 wrapped with the filter wrapper 110a and the smoking material portion 120 wrapped with the smoking material wrapper 120a may be wrapped together by the tipping paper 130.

Figure 3:
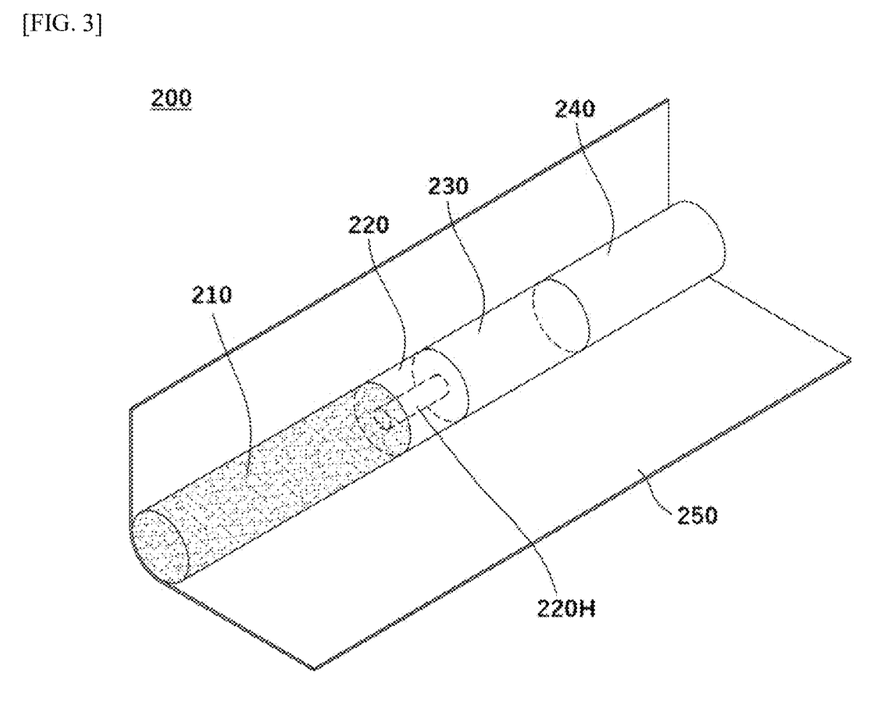
FIG. 3 is a view illustrating a configuration of a non-combustion type smoking article in which the smoking article filter according to some embodiments of the present disclosure is adopted.

FIG. 3 is a view illustrating a configuration of a non-combustion type smoking article in which the smoking article filter according to some embodiments of the present disclosure is adopted.

Referring to FIG. 3, a smoking article 200 may include a smoking material portion 210, a support structure 220, a cooling structure 230, a mouthpiece portion 240, and a wrapper 250. Although not illustrated, one or more of the smoking material portion 210, the support structure 220, the cooling structure 230, and the mouthpiece portion 240 may be individually wrapped with separate wrappers before being wrapped with the wrapper 250. For example, the smoking material portion 210 may be wrapped with a smoking material wrapper (not illustrated), and at least one of the support structure 220, the cooling structure 230, and the mouthpiece portion 240 may be wrapped with a filter wrapper (not illustrated).

The smoking material portion 210 may include an aerosol-generating material. For example, the aerosol-generating material may include at least one of glycerin, propylene glycol, ethylene glycol, dipropylene glycol, diethylene glycol, triethylene glycol, tetraethylene glycol, and oleyl alcohol, but is not limited thereto.

In some embodiments, the smoking material portion 210 may also be filled with a reconstituted tobacco sheet. In some other embodiments, the smoking material portion 210 may also be filled with a plurality of tobacco strands obtained by cutting the reconstituted tobacco sheet into pieces. For example, a plurality of tobacco strands in the smoking material portion 210 may be arranged in the same direction (i.e., parallel to one another) or in random directions.

The support structure 220 may be a tubular structure including a hollow 220H formed therein. The support structure 220 may also be manufactured by inserting structures such as films or tubes made of the same or different materials thereinto (that is, into the hollow 220H).

The support structure 220 may be manufactured using cellulose acetate. Accordingly, the materials inside the smoking material portion 210 are prevented from being pushed backwards (that is, in a downstream direction) when a heater 2300 is being inserted, and an aerosol cooling effect may also be generated.

The cooling structure 230 may serve as a cooling member that cools an aerosol which is generated due to a heater (not illustrated) of an aerosol generation device, which is used together with the smoking article 200, heating the smoking material portion 210. Accordingly, the user may inhale an aerosol that is cooled to a suitable temperature.

The cooling structure 230 may have various structures such as a structure in which polymer fibers such as polylactic acid (PLA) are woven, a structure in which a porous paper sheet is wrapped, a tubular cellulose acetate structure having a hollow formed therein, or a paper tube which is made of paper and has a hollow formed therein.

The mouthpiece portion 240 may be disposed at a downstream end of the smoking article 200 to serve as a filter that finally delivers the aerosol, which is delivered from upstream, to the user. In some embodiments, the mouthpiece portion 240 may be a cellulose acetate filter. Although not illustrated, the mouthpiece portion 240 may be manufactured as a recess filter, or the mouthpiece portion 240 may include at least one crushable capsule (not illustrated) including a flavoring component.

The wrapper 250 may prevent the combustion of the smoking article 200. Also, the wrapper 250 may prevent a holder of an aerosol generation device (not illustrated) from being contaminated by materials generated in the smoking article 200.

Meanwhile, although not illustrated, the smoking article 200 may further include a front-end filter segment that is disposed upstream of the smoking material portion 210. The front-end filter segment may abut the smoking material portion 210 and have an aerosol channel formed therein (in this case, the configuration of at least one component of the support structure 220 and the cooling structure 230 may be omitted). The front-end filter segment may prevent the smoking material portion 210 from falling off the smoking article 300 and may also prevent a liquefied aerosol in the smoking material portion 210 from leaking out of the smoking article during smoking.

Meanwhile, at least one of the above-described support structure 220, cooling structure 230, mouthpiece portion 240, and front-end filter segment may be a filter that is flavored using the method described above with reference to FIG. 1. That is, a flavoring agent, which is in a solid state at room temperature and includes at least one natural wax and a flavoring component soaked into the at least one natural wax, may be uniformly distributed into the support structure 220, the cooling structure 230, the mouthpiece portion 240, or the front-end filter segment. In some embodiments, a weight of the flavoring agent per unit volume ($mm^3$) of each segment may be in a range of about 1 μg to 30 μg, preferably, in a range of 2 μg to 10 μg.

In this way, in a case in which the solid flavoring agent of the present disclosure is applied to at least some segments of the smoking article 200, retention of the added flavoring component may be secured. In particular, in a case in which the solid flavoring agent of the present disclosure is applied to the support structure 220 and/or the cooling structure 230, the support structure 220 and/or the cooling structure 230 may additionally serve as a blocking layer that blocks the spread of components between the smoking material portion 210 and the mouthpiece portion 240.

Hereinafter, the configurations of the present disclosure and the advantageous effects according thereto will be described in more detail using examples and comparative examples. However, the examples are merely for describing the present disclosure in more detail, and the scope of the present disclosure is not limited by the examples.

Example 1

A filter portion was removed from a regular cigarette manufactured for testing of examples, and a filter having a solid flavoring agent added thereinto was combined with a medium portion to manufacture a cigarette having the same structure as the smoking article 100 illustrated in FIG. 2. Specifically, about 3 mg of a flavoring agent made of about 50 wt % natural wax and about 50 wt % L-menthol was added to the filter, and as the natural wax, natural wax made of about 50 wt % cocoa butter and about 50 wt % shea butter was used. The flavoring agent was prepared at a temperature of about 70° C. and then was added at a temperature of about 60° C. into a filter rod using a transfer jet nozzle system (TJNS) method. The manufactured filter was stored at room temperature for about 2 days and then assembled into a cigarette.

Comparative Example 1

A filter and a cigarette were manufactured in the same way as in Example 1 except for using a flavoring agent made of about 50 wt % medium chain fatty acid triglyceride (MCTG) and about 50 wt % L-menthol.

Comparative Example 2

A filter and a cigarette were manufactured in the same way as in Example 1 except for using a flavoring agent made of about 30 wt % natural wax and about 70 wt % L-menthol.

Comparative Example 3

A filter and a cigarette were manufactured in the same way as in Example 1 except for using a flavoring agent made of about 70 wt % natural wax and about 30 wt % L-menthol.

Comparative Example 4

A filter and a cigarette were manufactured in the same way as in Example 1 except for using a flavoring agent made of about 50 wt % natural wax, which is made of beeswax, and about 50 wt % L-menthol.

Figure 4:
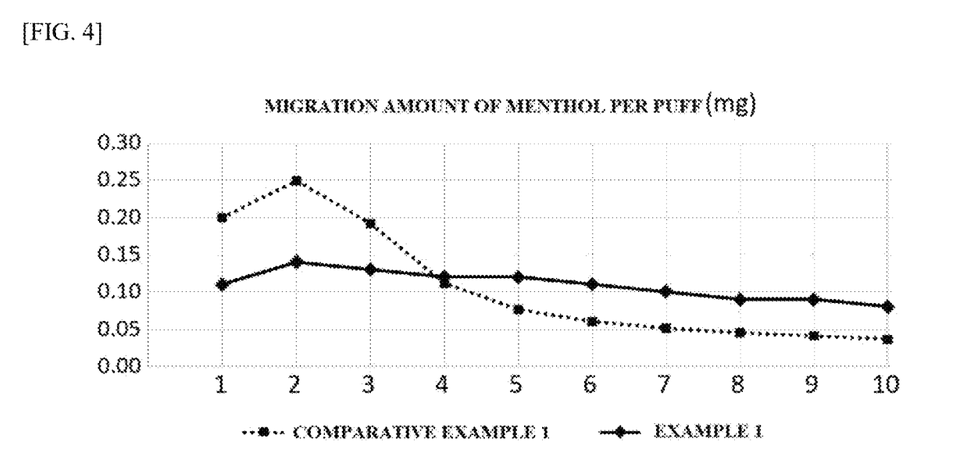
FIG. 4 is a view illustrating changes in the migration amount of menthol per puff for each example in order to confirm performance relating to flavor persistence of smoking articles according to some embodiments of the present disclosure.

Experimental Example 1: Analysis of Amount of Residual Menthol in Filter and Amount of Menthol in Smoke Component In order to evaluate flavor retention in a filter and a degree of flavor expression during smoking, components in the filter of each of the cigarettes according to Example 1 and Comparative Examples 1 to 4 and smoke components thereof were analyzed and the results are shown in Table 1. Also, the changes in the migration amount of menthol per puff is shown in FIG. 4. Smoke was repeatedly collected three times for each sample, based on ten puffs each time. Average values of three collection results were calculated. The cigarettes were tested according to Health Canada (HC) smoking conditions using an automatic smoking device in a smoking room with a temperature of about 20° C. and humidity of about 62.5%. In Table 1, "first wax" refers to natural wax made of about 50 wt % cocoa butter and about 50 wt % shea butter, and "second wax" refers to natural wax made of 100 wt % beeswax.

TABLE 1

| Classification | | Residual mount of L-menthol in filter (mg) | | | | Amount of expressed L-menthol (mg) | |
| --- | --- | --- | --- | --- | --- | --- | --- |
| | | Directly after manufacture | | 4 weeks after manufacture | | (4 weeks after manufacture) | |
| | | mg | % | mg | % | mg | % |
| Example 1 | first wax 50% | 1.50 | 100.0 | 1.46 | 97.3 | 1.79 | 119.3 |
| Comparative Example 1 | MCTG 50% | 1.41 | 94.0 | 1.19 | 79.3 | 1.31 | 87.3 |
| Comparative Example 2 | first wax 30% | 2.02 | 96.2 | 1.88 | 89.5 | 2.25 | 107.1 |
| Comparative Example 3 | first wax 70% | 0.90 | 100.0 | 0.89 | 98.8 | 1.04 | 115.6 |
| Comparative Example 4 | second wax 50% | 1.50 | 100.0 | 1.47 | 98.0 | 1.53 | 102.0 |

As shown in Table 1, there was no significant difference between the example and the comparative examples in terms of the residual amount of L-menthol component in the filters directly after manufacture of the cigarettes, but, four weeks after the manufacture of the cigarettes, there was a significant difference between the example and the comparative examples in terms of the residual amount of L-menthol in the filters and the amount of L-menthol component in mainstream smoke. Specifically, a flavor retention rate was found to be much higher in Example 1 and Comparative Examples 2 to 4 in which natural wax was used as a solvent, as compared to Comparative Example 1 in which MCTG was used as a solvent. In this way, it was confirmed that using a flavoring agent made of natural wax and a flavoring component is advantageous in terms of flavor retention. From the results of Example 1 and Comparative Examples 2 to 4, it can also be seen that the flavor retention rate increases with an increase in the amount of natural wax component in the flavoring agent. With regards to the amount of expressed L-menthol in the mainstream smoke component, it can be seen that the amount of expressed flavor was significantly larger in Example 1 in which the first wax constituted 50 wt % of the flavoring agent, as compared to the comparative examples. Specifically, in the case of Example 1, it was found that, four weeks after manufacture, the flavor retention rate was lower but the flavor expression rate was higher as compared to the case of Comparative Example 3 or 4. Accordingly, it was confirmed that the flavor retention characteristic and flavor expression characteristic are not substantially proportional to each other.

In view of the above results, it can be seen that both the flavor retention characteristic and flavor expression characteristic will be excellent when the amount of the first wax contained in the flavoring agent is 35 wt % to 65 wt %.

Meanwhile, with regards to the L-menthol expression rate of Table 1, there are cases in which the amount of expressed L-menthol is greater than (that is, exceeds 100% of) the amount of added L-menthol, but such cases are assumed to be due to an additional menthol component being added into the cigarette due to casing, wrapper flavoring, or the like in a medium portion-related process, other than L-menthol added as a flavoring agent to the filter portion.

Further, referring to FIG. 4, it can be seen that, in the case of Comparative Example 1, the migration amount of menthol was high in the first three puffs but sharply decreased from the fourth puff, but in the case of Example 1, the migration amount of menthol was substantially similar from the first puff to the last puff. That is, it was confirmed that the smoking article according to the embodiments of the present disclosure is advantageous not only in terms of the flavor retention characteristic as described above but also in terms of flavor persistence.

Meanwhile, the experiment was conducted on the combustion-type cigarette described above with reference to FIG. 2, but the non-combustion type cigarette described above with reference to FIG. 3 was expected to have a greater difference in terms of the flavor expression characteristic. Specifically, the above was expected because the reason why the amount of expressed menthol is smaller in Comparative Examples 3 and 4 than in Example 1 (in which the residual amount of menthol was smaller than in Comparative Examples 3 and 4) is that a phase transition of natural wax and expression of a flavoring component soaked in the natural wax occurred more slowly in Comparative Examples 3 and 4 than in Example 1. More specifically, the above was expected because the case of Comparative Example 3, in which the amount of natural wax was greater than in Example 1 and was more than necessary, and the case of Comparative Example 4, in which beeswax having a higher melting point than cocoa butter and shea butter of Example 1 was used, are more disadvantageous than Example 1 in terms of the flavor expression characteristic, and the difference in terms of the flavor expression characteristic would be more prominent in the non-combustion type cigarette in which a mainstream smoke temperature is lower as compared to the combustion-type cigarette.

Experimental Example 2: Analysis of Menthol Migration Patterns During Storage of Cigarettes In order to check migration patterns of a flavoring component during storage of cigarettes, segments of the cigarettes were separated four weeks after the manufacture of the cigarettes to analyze the menthol content in each of the segments.

TABLE 2

| Classification | | L-menthol content in each segment (mg (%)) | | | |
|---|---|---|---|---|---|
| | | Filter portion | Medium portion | Wrapper | Total |
| Example 1 | First wax 50% | 1.46 (55.5%) | 0.92 (35.0%) | 0.25 (9.5%) | 2.63 (100%) |
| Comparative Example 1 | MCTG 50% | 1.19 (48.4%) | 0.95 (38.6%) | 0.32 (13.0%) | 2.46 (100%) |
| Comparative Example 2 | First wax 30% | 1.88 (53.6%) | 1.22 (34.8%) | 0.41 (11.7%) | 3.51 (100%) |

As shown in Table 2, taking into account that there is no difference in configurations of a medium portion and a wrapper between the example and the comparative examples, it can be seen that movement of the flavoring component from inside a filter portion to other segments was the least in Example 1 in which the first wax constituted 50 wt % of the flavoring agent. Specifically, it can be seen that, in the case of Comparative Example 1, not only the amount of lost flavor was great in the filter portion but also the amount of flavor spread from the filter portion to other segments was also great. In the case of Comparative Example 2, the amount of lost flavor and the amount of spread flavor were relatively less as compared to Comparative Example 1 but were slightly greater as compared to Example 1. From this, it is expected that occurrence of a tobacco smoke taste degradation problem, an off-flavor problem, and the like due to the spread of the flavoring component from the filter portion to other segments would be the least in Example 1.

Comparative Example 5

A smoking material portion was removed from a regular cigarette manufactured for testing of examples, and a smoking material portion having a solid flavoring agent added thereinto was combined with a filter portion to manufacture a cigarette having the same structure as the smoking article 100 illustrated in FIG. 2.

Specifically, about 3 mg of a flavoring agent made of about 50 wt % natural wax and about 50 wt % L-menthol was added to the smoking material portion, and as the natural wax, natural wax made of about 50 wt % cocoa butter and about 50 wt % shea butter was used.

Experimental Example 3: Evaluation of Sensory Characteristics of Smoking

Figure 5:
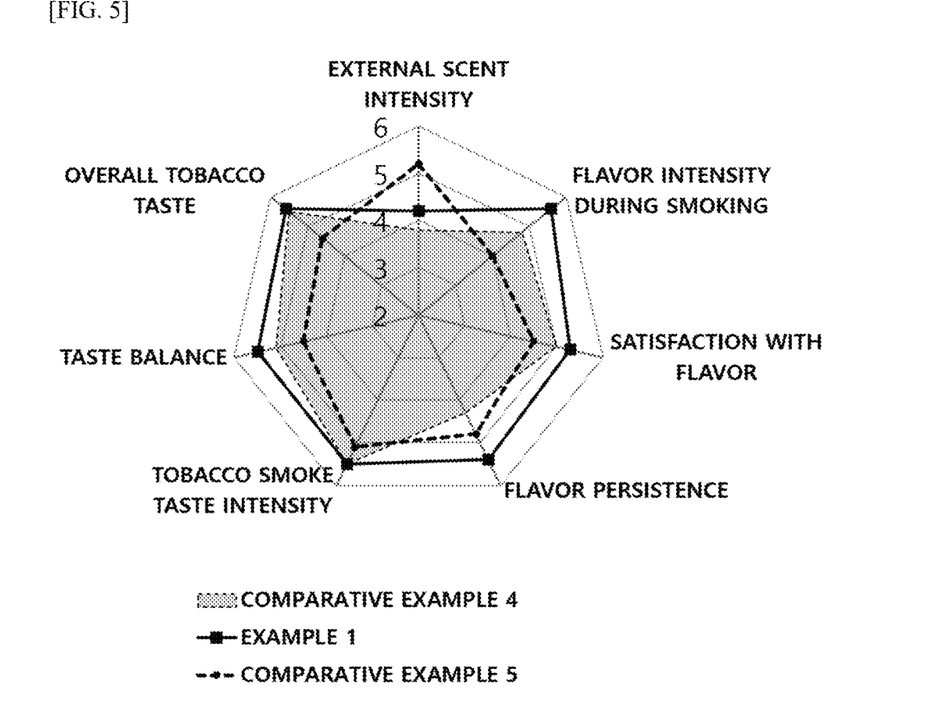
FIG. 5 shows results of sensory evaluation of the smoking articles according to some embodiments of the present disclosure.

Sensory evaluation was carried out for external scent intensity, flavor intensity during smoking, satisfaction with flavor, flavor persistence, tobacco smoke taste intensity, taste balance, and overall tobacco taste for Example 1 in which a flavoring agent containing 50 wt % of a first wax (cacao butter, shea butter) was added into a filter portion, Comparative Example 4 in which a flavoring agent containing 50 wt % of a second wax (beeswax) was added into a filter portion, and Comparative Example 5 in which a flavoring agent containing 50 wt % of the first wax was added into a medium portion. Results of the sensory evaluation are shown in FIG. 5. The sensory evaluation was carried out by a panel of twenty evaluators, based on a scale of 7 points, using cigarettes for each example which were manufactured four weeks beforehand.

FIG. 5 shows results of the sensory evaluation of the smoking articles according to some embodiments of the present disclosure.

As illustrated in FIG. 5, the flavor intensity during smoking, satisfaction with flavor, flavor persistence, and taste balance were found to be superior in Example 1 as compared to Comparative Examples 4 and 5, and thus it was confirmed that the sensory characteristics were the best in Example 1 in which the flavoring agent containing 50 wt % first wax was added into the filter portion.

Meanwhile, in the case of Comparative Example 5, the external scent intensity of the cigarette before smoking was significantly higher than in Example 1 and Comparative Example 4, but the characteristics of the flavor substantially delivered to the user during smoking (the flavor intensity during smoking, satisfaction with flavor, and flavor persistence) were found to be relatively inferior. Thus, it can also be seen that, in terms of the sensory characteristics, applying the flavoring agent to the filter portion is more advantageous than applying the flavoring agent to the medium portion.

In the case of Comparative Example 4, it can be seen that, from the fact that the external scent intensity was the lowest, the flavor retention characteristic was superior as compared to Example 1 and Comparative Example 5, but it can also be seen that the flavor expression characteristic during smoking of the flavoring component added into the filter portion was inferior as compared to Example 1.

Through the above results, it can be seen that it is possible to enhance the overall satisfaction with tobacco itself and the flavor thereof in a case in which the filter having the solid flavoring agent added thereinto according to the embodiments of the present disclosure is applied to a cigarette.

Those of ordinary skill in the art related to the present embodiments should understand that the present disclosure may be implemented in modified forms within the scope not departing from essential characteristics of the above description. Therefore, the methods disclosed herein should be considered as illustrative rather than limiting. The scope of the present disclosure is defined by the claims below rather than by the above description, and all differences within the scope equivalent to the claims should be interpreted as falling within the scope of the present disclosure.

What is claimed is:

1. A smoking article filter comprising:
    a flavoring agent uniformly distributed in the smoking article filter,
    wherein the flavoring agent is in a solid state at room temperature and includes at least one natural wax and a flavoring component soaked into the at least one natural wax,
    wherein the flavoring agent is formed from the at least one natural wax and the flavoring component in a weight ratio of 4:6 to 6:4, and
    wherein the at least one natural wax is formed from cocoa butter and shea butter in a weight ratio of 3:7 to 7:3.

2. The smoking article filter of claim 1, wherein a melting point of the flavoring agent is in a range of 30° C. to 80° C.

3. The smoking article filter of claim 1, wherein a melting point of the at least one natural wax is in a range of 30° C. to 50° C., and a melting point of the flavoring agent is in a range of 25° C. to 45° C.

4. The smoking article filter of claim 1, wherein a total weight of the flavoring agent contained in the smoking article filter is in a range of 1 mg to 25 mg.

5. The smoking article filter of claim 1, wherein a weight of the flavoring agent contained in unit volume (mm³) of the smoking article filter is in a range of 1 μg to 30 μg.

6. The smoking article filter of claim 1, wherein a weight of the at least one natural wax included in the flavoring agent is in a range of 20% to 98% of the total weight of the flavoring agent.

7. The smoking article filter of claim 1, wherein the flavoring component includes L-menthol.

8. A smoking article comprising:
the smoking article filter of claim 1; and
a smoking material portion disposed upstream of the smoking article filter.

9. The smoking article of claim 8, further comprising a tube filter which is disposed between the smoking article filter and the smoking material portion, has a hollow formed inside, and has a flavoring agent uniformly distributed within the areas occupied by the physical structure of in the tube filter.

* * * * *